(12) United States Patent
Vernersson et al.

(10) Patent No.: US 9,758,003 B2
(45) Date of Patent: Sep. 12, 2017

(54) HITCH ADAPTER DEVICE FOR TOW BALL

(71) Applicant: VOLVO CAR CORPORATION, Gothenburg (SE)

(72) Inventors: Kristian Vernersson, Stenungsund (SE); Hakan Gerdsberg, Torslanda (SE); Mikael Riski, Nodinge (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 15/070,510

(22) Filed: Mar. 15, 2016

(65) Prior Publication Data

US 2016/0280022 A1 Sep. 29, 2016

(30) Foreign Application Priority Data

Mar. 24, 2015 (EP) .................................... 15160500

(51) Int. Cl.
| | |
|---|---|
| *B60D 1/06* | (2006.01) |
| *B60D 1/145* | (2006.01) |
| *B60D 1/07* | (2006.01) |
| *B60R 9/06* | (2006.01) |

(52) U.S. Cl.
CPC ............. *B60D 1/145* (2013.01); *B60D 1/065* (2013.01); *B60D 1/075* (2013.01); *B60R 9/06* (2013.01)

(58) Field of Classification Search
CPC .......... B60D 1/145; B60D 1/06; B60D 1/065; B60D 1/07; B60D 1/075
See application file for complete search history.

(56) References Cited

U.S. PATENT DOCUMENTS

| | | | | |
|---|---|---|---|---|
| 3,889,978 | A * | 6/1975 | Kann ..................... | B60D 1/065 280/417.1 |
| 5,067,742 | A * | 11/1991 | Relja ....................... | B60D 1/07 280/477 |
| 6,623,025 | B2 * | 9/2003 | McCoy .................... | B60D 1/06 224/519 |
| 6,776,431 | B1 * | 8/2004 | Dick ...................... | B60D 1/065 280/416.1 |
| 7,143,914 | B2 * | 12/2006 | McManus ................ | B60R 9/06 224/519 |
| 7,954,839 | B2 * | 6/2011 | Quiring ................... | B60D 1/06 280/441.2 |
| 2003/0184046 | A1 * | 10/2003 | Bourgault ............... | B60D 1/06 280/417.1 |
| 2007/0215565 | A1 | 9/2007 | Huang | |

FOREIGN PATENT DOCUMENTS

| | | |
|---|---|---|
| EP | 1440846 A1 | 7/2004 |
| EP | 2774785 A1 | 9/2014 |

OTHER PUBLICATIONS

Extended European Search Report Dated Oct. 5, 2015, Application No. 15160500.3-1757, Applicant Volvo Car Corporation, 6 Pages.

* cited by examiner

*Primary Examiner* — Kevin Hurley
(74) *Attorney, Agent, or Firm* — Brooks Kushman P.C.

(57) ABSTRACT

A hitch adapter device for a vehicle tow ball comprises a fastening device adapted to fixedly arrange the hitch adapter device to the vehicle tow ball in a releasable manner. The hitch adapter device further comprises a receiving tube adapted to receive an object to be hitched to a vehicle comprising the vehicle tow ball.

20 Claims, 3 Drawing Sheets

HITCH ADAPTER DEVICE FOR TOW BALL

CROSS-REFERENCE TO RELATED APPLICATIONS

This application claims foreign priority benefits under 35 U.S.C. §119(a)-(d) to European patent application number EP 15160500.3, filed Mar. 24, 2015, which is incorporated by reference in its entirety.

TECHNICAL FIELD

The present disclosure relates generally to a hitch adapter device for a tow ball on a vehicle.

BACKGROUND

Traditional hitch tow bar receiver tubes as used for instance in North America, used in the rear of vehicles e.g., for towing trailers after mounting a tow ball in the receiver tube, generally have a less attractive aesthetic appearance and are further, by necessity, so arranged to the vehicle that they are constantly in the field of view for someone standing or driving behind the vehicle equipped with such hitch tow bar receiver tube. The hitch tow bar receiver tube commonly used is essentially a 2", i.e., ca 50 mm square receiver tube, fixedly arranged to the vehicle chassis. For the purpose of removing a design-wise unwanted feature, it is an aim to have a swiveling tow bar of EU-type with 2" ball instead of 50 mm (EU standard) that may be arranged in two positions, one hidden, non-operating position wherein the swiveling tow bar with tow ball is swiveled to a position below the vehicle, and one operating position, wherein the swiveling tow bar with tow ball is swiveled to a visible, operating position behind the vehicle.

Towing trailers in North America will be facilitated with the above swiveling tow ball, as no detachable tow ball would first have to be arranged in the receiver tube since trailers in North America make use of trailers with ball socket coupling devices for arranging on tow bar balls. A drawback with such solution is however, that those who want to mount a US type carrier, such as e.g., bicycle carrier having a square tube that shall be placed in the hitch tow bar receiver tube faces a problem as this is not possible with the swiveling tow bar with tow ball.

SUMMARY

An object of the present disclosure is to provide a hitch adapter for a tow ball which is versatile and enables hitching of a plurality of devices or objects to a vehicle equipped with a tow ball.

A further object of the present disclosure is to provide a hitch adapter for a tow ball which enables a quick attaching of device or objects and which is robust.

According to one embodiment an a hitch adapter device for a vehicle tow ball is provided wherein the hitch adapter device comprises a fastening device adapted to fixedly arrange the hitch adapter device to a vehicle tow ball in a releasable manner, wherein the hitch adapter device further comprises a receiving tube adapted to receive an object to be hitched to a vehicle comprising the vehicle tow ball.

According to another embodiment, the receiving tube comprises four side walls and a central opening defined by the four side walls in that the four side walls forms the periphery of the opening, wherein the opening is adapted for receiving the object to be hitched.

According to another embodiment, the receiving tube is a square tube, comprising a square opening.

According to another embodiment, the length of the respective four side walls at the perimeter of the opening is 30-60 mm, more preferably 45 mm-55 mm.

According to another embodiment, the hitch adapter device comprises one a single receiving tube.

According to another embodiment, the receiving tube comprises an object retention arrangement for retention of the object to be hitched.

According to another embodiment, the object retention arrangement comprises at least one hole in the receiving tube for receiving a pin engaging with the receiving tube and the object to be hitched.

According to another embodiment, the hitch adapter device is fixedly arranged by rotatably and linearly locking the hitch adapter device to the vehicle tow ball.

According to another embodiment, the hitch adapter device is made of steel.

According to another embodiment, the receiving tube has a length of 75 mm-200 mm, more preferably 100-175 mm, most preferably 150 mm.

According to another embodiment, the receiving tube comprises side walls having a thickness of at least between 3 mm to 8 mm, more preferably between 4 mm-6 mm.

According to another embodiment, the fastening device is arranged at a first end portion of the hitch adapter device and comprises a fastening device opening, wherein the receiving tube is arranged at a second end portion of the hitch adapter device.

According to another embodiment, the fastening device opening is directed essentially perpendicular to the opening of the receiving tube.

According to another embodiment a method for manufacturing a hitch adapter device is provided, comprising the steps: providing a tow ball fastening device having an opening pointing in a first direction, providing a receiving tube with a tube opening pointing in a second direction perpendicular to the first direction, fixating the tow ball fastening device to the receiving tube.

According to another embodiment, the method further comprises fixating the tow ball fastening device to the receiving tube is carried out by means of welding.

According to another embodiment a method for manufacturing a hitch adapter device according to any of the embodiments described in paragraphs [0007]-[0019] is provided, and the method may comprise the steps of paragraph [0020] or paragraph [0021].

BRIEF DESCRIPTION OF THE DRAWINGS

Embodiments according to the disclosure are described below, by way of example, with reference to the attached drawings.

DETAILED DESCRIPTION

Figure 1:
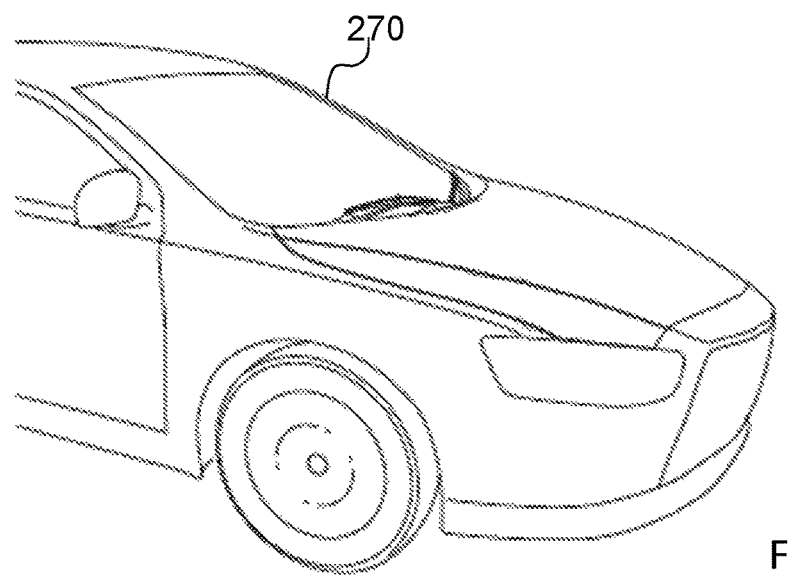
FIG. 1 shows a vehicle which may be equipped with a tow ball at rear portion of the vehicle.

In the following, a detailed description will be given. In the drawing figures, like reference numerals designate identical or corresponding elements throughout the several figures. It will be appreciated that these figures are for illustration only and do not in any way restrict the scope of the disclosure. Furthermore, the figures are not necessarily to scale. Some features may be exaggerated or minimized to show details of particular components. Therefore, specific structural and functional details disclosed herein are not to be interpreted as limiting, but merely as a representative basis for teaching one skilled in the art.

FIG. 1 shows a vehicle 270 which is arranged with a vehicle tow bar 10a at its rear portion (not shown).

Figure 2:
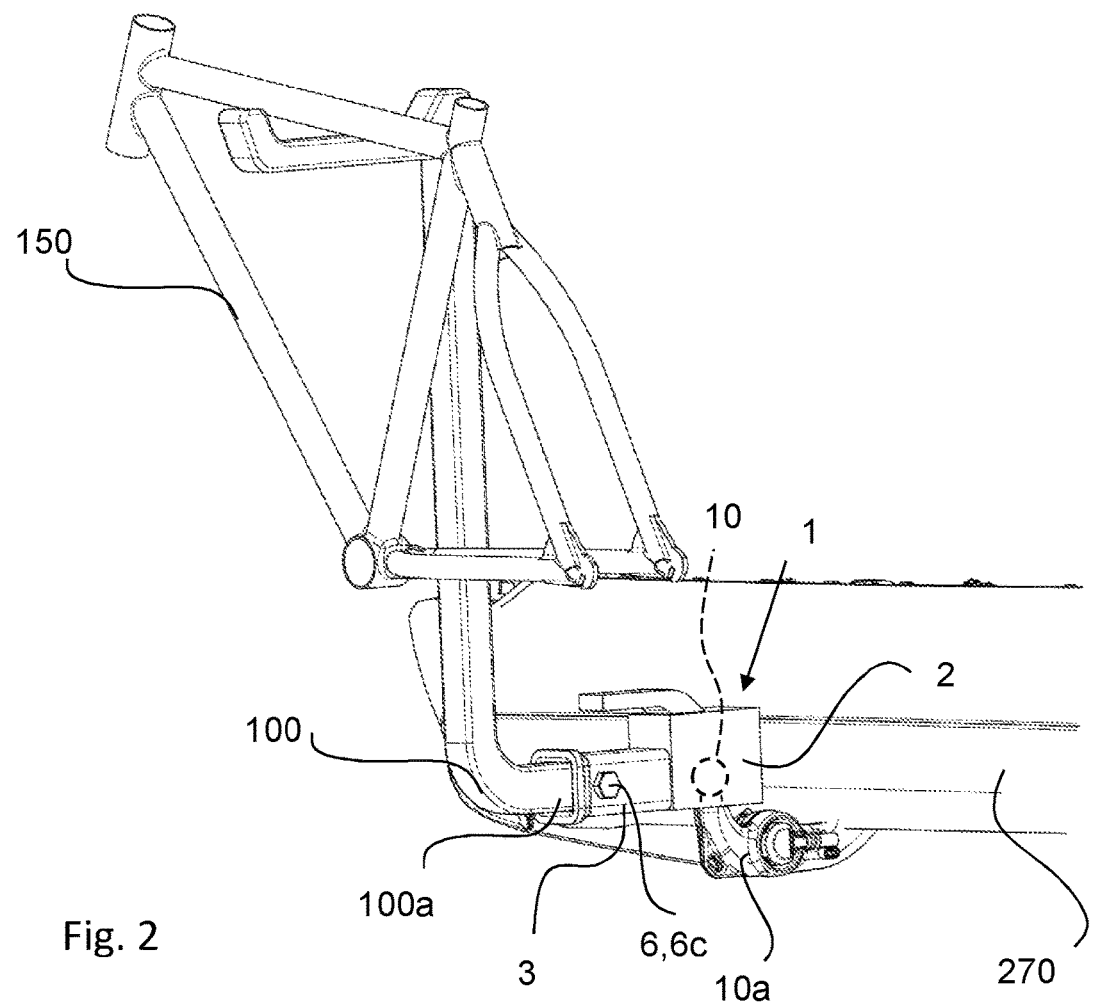
FIG. 2 shows a perspective view of a hitch adapter device according to the disclosure, arranged to a tow ball of a vehicle, and further an object arranged in the hitch adapter device and thereby hitched to the vehicle.

FIG. 2 shows a perspective view of a hitch adapter device 1, according to the disclosure, which is fixedly arranged to a tow ball 10 arranged to the tow bar 10a of a vehicle 270 in a releasable manner. The tow bar 10a comprises a tow ball 10 at its end which is enclosed by the hitch adapter 1 and thereby not shown. The tow bar 10a may be a rotatable tow bar, rotatable between a hidden, non-use position and an extended, use-position. The hitch adapter device 1 comprises a fastening device 2 which is used for arranging the hitch adapter device 1 to the tow ball 10. The hitch adapter device 1 further comprises a receiving portion 3 for receiving an object 100 to be hitched to the vehicle 270. According to one embodiment, the receiving portion is a receiving tube 3. As seen in FIG. 2, the object 100 to be hitched to the vehicle 270 may be a bicycle carrier for carrying one or several bicycles or any kind of load carrying object. According to one embodiment, the object 100 is a tube shaped to fit the receiving tube 3. The object 100 to be hitched to the vehicle 270 comprises a securing portion adapted to be arranged and fixedly secured in the receiving portion 3 for instance by the aid of an object retention arrangement 6.

Figure 3A:
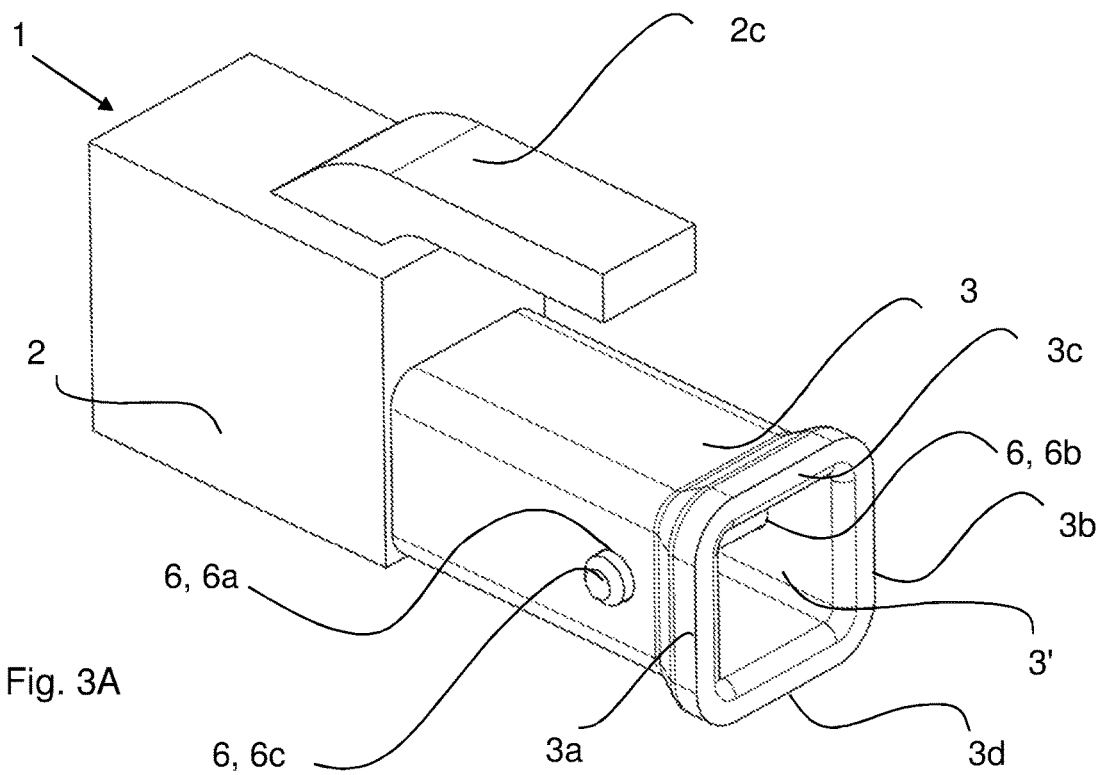
FIG. 3A shows a perspective view of the hitch adapter device according to FIG. 1.

FIG. 3A shows a perspective view of the hitch adapter device 1. According to one embodiment, the object retention arrangement 6 may comprise a first opening 6a or slot 6a in the first side wall portion 3a of the receiving portion 3 and a locking pin 6c or bolt 6c arranged through said opening 6a and a mating opening 106a of the object 100 when the object 100 is arranged in the receiving portion 3. According to one embodiment, the object retention arrangement 6 comprises a second opening 6b or slot 6b arranged in the second side wall portion 3b of the receiving portion 3, opposite the first side wall portion 3a and aligned with the first opening 6a. The object 100 may comprise a mating opening 106b opposite the mating opening 106a. Hereby a bolt 6c may be arranged to extend through the first opening 6a, the mating opening 106a, the mating opening 106b and the second opening 6b wherein the bolt 6c is fixedly secured by a nut to secure the object 100 to the hitch adapter device 1. Alternatively, according to one embodiment, a locking pin 6c comprises a circumferential groove around the pin, wherein a clip may be arranged in said groove and thereby being fixed in a axial direction in relation to the pin 6c, whereby the pin is axially secured after being arranged to extend through the first opening 6a, the mating opening 106a, the mating opening 106b and the second opening 6b.

According to one embodiment, the hitch adapter device 1 comprises a fastening device 2 adapted to fixedly arrange the hitch adapter 1 to a ball shaped object in a releasable manner, wherein the ball shaped object may be a tow ball 10 arranged to a vehicle 270. Thus, the fastening device 2 is also known as a tow ball fastening device 2, a tow ball coupling device 2, a tow ball attachment device 2. The fastening device 2 may be any type of known standard type fastening-, clamping-, coupling- or locking device for securely fastening a device to a tow ball 10. According to one embodiment, the fastening device 2 comprises an actuating device, which, upon activation fixedly arranges the hitch adapter 1 to the tow ball 10 as well as releases the hitch adapter device 1 from the tow ball 10.

Figure 3B:
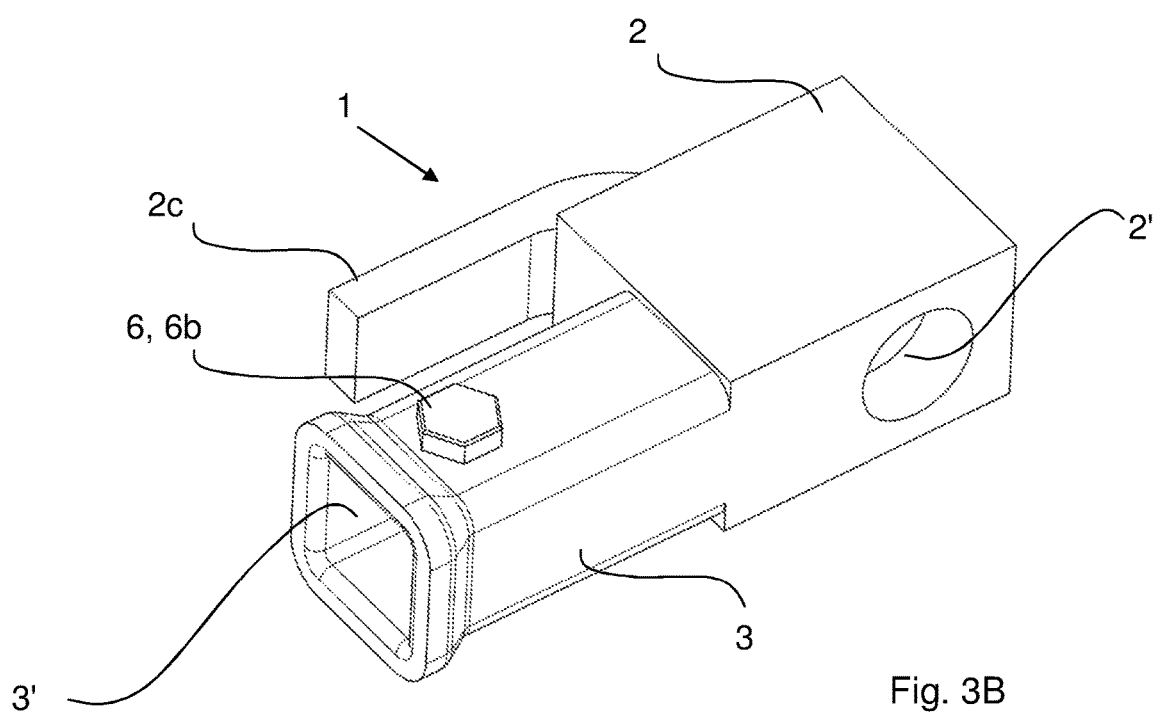
FIG. 3B shows perspective view of the hitch adapter device according to FIG. 1.

As seen in FIG. 3B, according to one embodiment, the fastening device 2 comprises a ball receiving portion 2', such as a socket portion 2' adapted to receive the tow ball 10. The ball receiving portion 2' comprises an opening 2' in the fastening device 2 as can further be seen in FIG. 2. The fastening device 2 further comprises a handle 2c, for enabling the locking and releasing of the fastening device 2 to the tow ball 10. According to one embodiment, the hitch adapter device 1 is fixedly arranged to the vehicle tow ball 10 by rotatably and linearly locking it, i.e., in a retentive manner, to the vehicle tow ball 10. According to one embodiment, the fastening device 2 is a ball clamp device 2 such as a standard EU-Bike Carrier glove device adapted to be fastened, clamped, coupled or locked to a tow ball of 2" (two inches) in diameter. According to one embodiment, the fastening device 2 is a ball clamp device 2 such as a standard EU-Bike Carrier glove device adapted to be fastened, clamped, coupled or locked to a tow ball of ca 50 mm in diameter.

Figure 4:
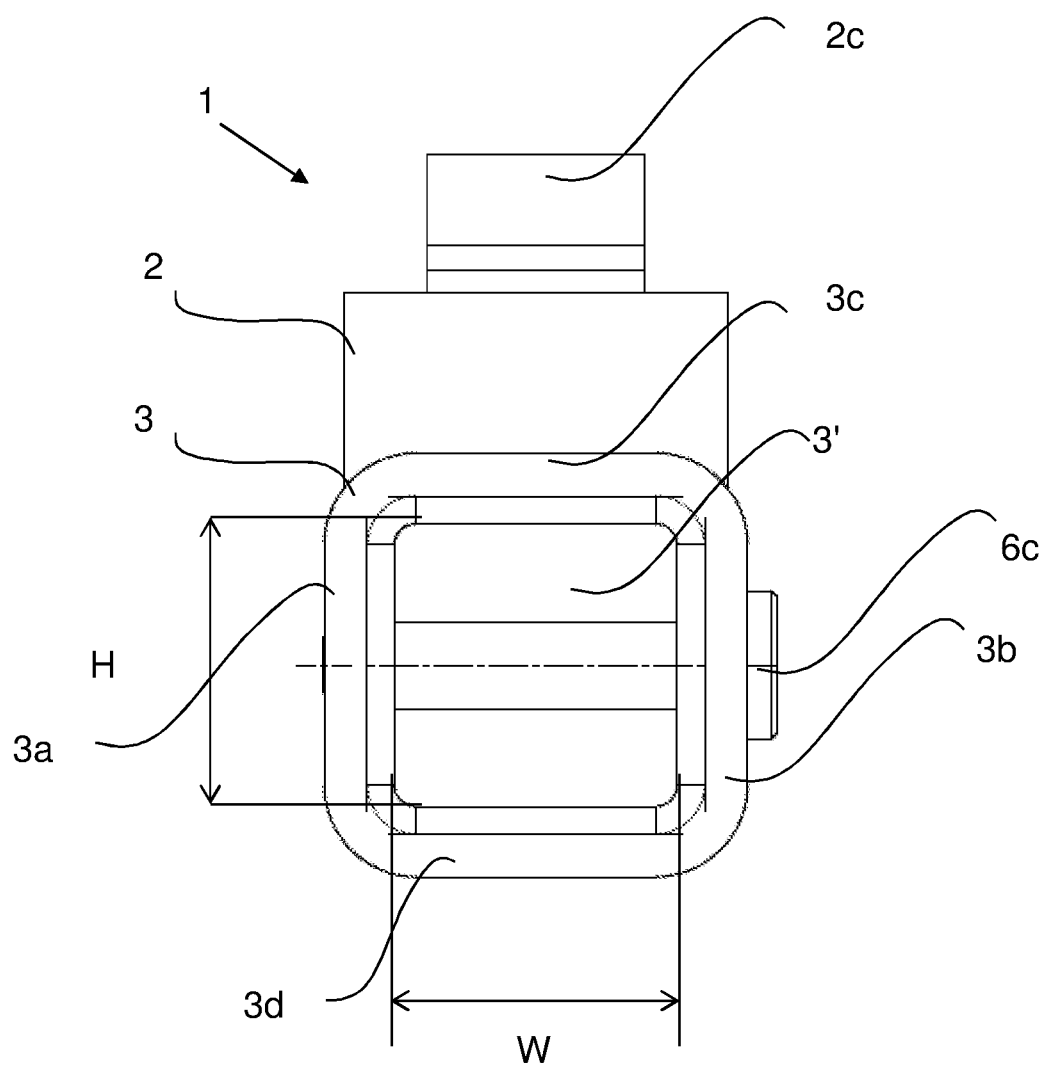
FIG. 4 shows a side view of the hitch adapter device according to FIG. 1.

FIG. 4 shows a side view of hitch adapter device 1 in a direction towards the opening 3' of the receiving tube 3. The receiving tube 3 comprises four side walls 3a, 3b, 3c, 3d and a central opening 3' defined by the four side walls in that the four side walls forms the periphery of the opening, wherein the opening is adapted for receiving the object 100 to be hitched. The periphery is thus defined by the inner walls of the respective side walls 3a, 3b, 3c, 3d. A first set of two side walls 3a, 3b, having a respective inner wall thereof which forms the part of the periphery of the opening 3', defines the height H of the opening 3'. According to one embodiment, the first set of two side walls 3a, 3b are parallel, i.e., extends in a parallel direction. According to one embodiment, a second set of two side walls 3c, 3d, having a respective inner wall thereof which forms the part of the periphery of the opening 3', defines the width W of the opening 3'. According to one embodiment, the second set of two side walls 3c, 3d are parallel, i.e., extends in a parallel direction. According to one embodiment, the direction the first 3a, 3b and second set 3c, 3d of side walls respectively are perpendicular in relation to each other, thereby forming a rectangularly shaped opening 3', i.e., a rectangular opening. According to one embodiment, the first and second set of side walls 3a, 3b, 3c, 3d have an equal length, thereby forming a square shaped opening, i.e., a square tube comprising a square opening 3'. According to one embodiment, the length of the respective four side walls (3a, 3b, 3c, 3d) at the perimeter of the opening (3') is 30-60 mm, more preferably, 45 mm-55 mm, more preferably 49-51 mm, more preferably 50 mm, most preferably 50.8 mm. A 50.8 mm opening 3' corresponds to a 2" (two inches) opening which forms the US standard size for common objects 100 to be hitched, i.e., US style bicycle carriers for carrying one or several bicycles to be arranged in vehicle tow bars comprising receiving tubes. These objects 100, have a mating portion to be arranged in the receiving tube 3 and opening 3', i.e., is rectangular or square shaped and is commonly made by a tube device of slightly smaller dimension compared to the receiving tube 3. Such mating portion 100*a* is shown in FIG. 2, whereby the mating portion 100*a* enters the receiving tube 3 of the hitch adapter device 1.

According to one embodiment, the receiving tube 3 has a side wall thickness of 3 mm-8 mm. According to one embodiment, the side wall thickness is 4 mm-6 mm. According to one embodiment, the thickness is measured at the point of the object retention arrangement 6. According to one embodiment, the end portion of the receiving tube 3 for receiving the object 100, is funnel-shaped wherein a slight increase of the width and height of the inner walls is formed in order to facilitate insertion of the object 100 to be hitched by increasing the tolerances. Further, the funnel shaped end portion of the receiving tube 3 makes it less sensitive to wear as a result of prolonged use. According to one embodiment, the receiving tube 3 is made of steel. According to one embodiment, the receiving tube 3 is fixedly arranged to the fastening device 2. According to one embodiment, the receiving tube 3 is arranged to the fastening device 2 by means of welding. According to one embodiment, and disclosed throughout the drawings, the hitch adapter device 1 comprises a single receiving tube 3, i.e., one single receiving tube 3, formed and shaped as described in this document to be sufficiently rigid to receive and carry an object 100 via a single object mating portion 100*a*. The object 100 which, since a plurality of bicycles could be arranged thereon if the object 100 is a bike carrier, may have a substantial weight. Hence, the mechanical interconnection between the hitch adapter device 1 and the object 100 to be hitched, is solely via the single receiving tube 3 of the hitch adapter device 1. Thereby, a swift arranging of the object 100 to be hitched to the vehicle is enabled since only one point of connection/fixating is necessary. The rigidity of the hitch adapter device 1 and the receiving tube 3 thereof, further makes it less sensitive to being damaged or worn out over time which could otherwise have the result that the object 100 to be hitched may no longer be fitted and arranged in the receiving tube as the dimensions of the hitch adapter has become altered. Further, standardized objects 100 or at least object mating portions 100*a* having the suitable shape to be arranged in the receiving tube 3 of the hitch adapter device 1 is already available on the market which will make the hitch adapter device 1 very useful for vehicles equipped with a tow ball only.

According to one embodiment, the receiving tube has a powder coating to resist rust and corrosion.

According to one embodiment, the hitch adapter device 1 comprises a fastening device 2 being arranged at a first end portion of the hitch adapter device 1, wherein the receiving tube 3 is arranged at a second end portion of the hitch adapter device 1. According to one embodiment the socket opening is directed essentially perpendicular to the opening 3' of the receiving tube 3. An effect of this is that the object 100 comprising a mating tube portion 100*a* continuing in the direction of the opening 3', will be directed further away from the vehicle 270 in a rearward direction when the hitch adapter device 1 is arranged by the fastening device 2 to a tow ball 10, and thus reduce the risk that bikes or other objects damages the vehicle 270. A sufficiently long mating portion 100*a* will also enable the opening of the rear door of the vehicle 270. According to one embodiment, the receiving tube 3 has a length of 75 mm-200 mm, more preferably 100-175 mm, most preferably 150 mm, in a direction of the opening 3'. According to one embodiment, the fastening device 2 has a length of 75 mm-200 mm, more preferably 100-175 mm, most preferably 150 mm. According to one embodiment, the length of the fastening device 2 is 50-100% of the length of the receiving tube 3 in a direction of the opening 3'. According to one embodiment, the direction of the opening 3' is defined as a normal direction to plane defined by the opening 3'.

According to one embodiment, a method for manufacturing a hitch adapter device is provided comprising the steps: providing a tow ball fastening device 2 having an opening 2' pointing in a first direction, providing a receiving tube 3 with a tube opening 3' pointing in a second direction perpendicular to the first direction, fixating the tow ball fastening device 2 to the receiving tube 3.

According to one embodiment, fixating the tow ball fastening device 2 to the receiving tube 3 is carried out by means of welding.

Embodiments of a hitch adapter according to the disclosure have been described. However, the person skilled in the art realizes that these can be varied within the scope of the appended claims without departing from the inventive idea.

All the described alternative embodiments above or parts of an embodiment can be freely combined without departing from the inventive idea as long as the combination is not contradictory.

What is claimed is:

1. A hitch adapter device for a vehicle tow ball, the hitch adapter device comprising:
a fastening device configured to fixedly arrange the hitch adapter device to the vehicle tow ball in a releasable manner; and
a single receiving tube fixedly connected to the fastening device and configured to receive an object to be hitched to a vehicle comprising the vehicle tow ball.

2. The hitch adapter device according to claim 1 wherein the receiving tube comprises four side walls and a central opening defined by the four side walls, wherein the opening is adapted far receiving the object to be hitched.

3. The hitch adapter device according to claim 2 wherein the receiving tube is a square tube comprising a square opening.

4. The hitch adapter device according to claim 3 wherein the length of each side wall at a perimeter of the opening is 30-60 mm.

5. The hitch adapter device according to claim 3 wherein the length of each side wall at a perimeter of the opening is 45-55 mm.

6. The hitch adapter device according to claim 1 wherein the receiving tube comprises an object retention arrangement for retention of the object to be hitched.

7. The hitch adapter device according to claim 6 wherein the object retention arrangement comprises at least one hole in the receiving tube for receiving a pin that is engageable with the receiving tube and the object to be hitched.

8. The hitch adapter device according to claim 1 wherein the hitch adapter device is fixedly arrangeable by rotatably and linearly locking the hitch adapter device to the vehicle tow ball.

9. The hitch adapter device according to claim 1 wherein the hitch adapter device is made of steel.

10. The hitch adapter device according to claim 1 wherein the receiving tube has a length of 75 mm-200 mm.

11. The hitch adapter device according to claim 1 wherein the receiving tube has a length of 100-175 mm.

12. The hitch adapter device according to claim 1 wherein the receiving tube comprises side walls having a thickness of at least 3 mm-8 mm.

13. The hitch adapter device according to claim 1 wherein the receiving tube comprises side walls having a thickness of 4 mm-6 mm.

14. The hitch adapter device according to claim 1 wherein the fastening device is arranged at a first end portion of the hitch adapter device and comprises a fastening device opening, wherein the receiving tube is arranged at a second end portion of the hitch adapter device.

15. The hitch adapter device according to claim 14 wherein the fastening device opening is directed essentially perpendicular to an opening of the receiving tube.

16. The hitch adapter device according to claim 1 wherein the receiving tube is welded to the fastening device.

17. The hitch adapter device according to claim 1 wherein the fastening device has an opening oriented in a first direction and configured to receive the vehicle tow ball, and the receiving tube has a tube opening oriented in a second direction perpendicular to the first direction and configured to receive a mating portion of the object so that a portion of the mating portion of the object is horizontally aligned with a portion of the vehicle tow ball when the vehicle tow ball is received in the opening.

18. A method for manufacturing a hitch adapter device comprising:

providing a tow ball fastening device having an opening pointing in a first direction, wherein the opening is configured to receive a vehicle tow ball;

providing a single receiving tube with a tube opening pointing in a second direction perpendicular to the first direction, wherein the tube opening is configured to receive an object to be hitched to a vehicle comprising the vehicle tow ball; and fixating the tow ball fastening device to the receiving tube.

19. The method according to claim 18 wherein the tube opening of the receiving tube is configured to receive a mating portion of the object to be hitched to the vehicle, so that a portion of the mating portion of the object is horizontally aligned with a portion of the vehicle tow ball when the vehicle tow ball is received in the opening of the fastening device.

20. The method of claim 18 wherein fixating the tow ball fastening device to the receiving tube is carried out by welding.

* * * * *